United States Patent
Kramer et al.

(10) Patent No.: US 6,853,292 B1
(45) Date of Patent: *Feb. 8, 2005

(54) SECURITY CONTROL SYSTEM, METHOD FOR THE OPERATION THEREOF

(75) Inventors: Manfred Kramer, Giessen (DE); Olaf Ziegler, Geilnau (DE); Rainer Thüringer, Giessen (DE); Volkmar Schneider, Angelburg (DE); Arno Krauskopf, Biebertal (DE)

(73) Assignee: ELAN Schaltelemente GmbH & Co KG, Wettenberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,304
(22) PCT Filed: Mar. 27, 1998
(86) PCT No.: PCT/EP98/01813
§ 371 (c)(1),
(2), (4) Date: Jan. 6, 2000
(87) PCT Pub. No.: WO98/44469
PCT Pub. Date: Oct. 8, 1998

(30) Foreign Application Priority Data

Mar. 27, 1997 (DE) .......................................... 197 12 992
Oct. 14, 1997 (DE) .......................................... 197 45 161

(51) Int. Cl.[7] .......................... G05B 23/02; G01R 31/00; G01R 31/08; G06F 11/00
(52) U.S. Cl. ...................... 340/3.43; 340/3.1; 324/500; 324/511; 714/24; 714/47
(58) Field of Search .................................. 340/3.43, 3.1; 324/500, 511; 700/108, 109, 110; 714/4, 24, 43, 47, 53

(56) References Cited

U.S. PATENT DOCUMENTS

| 4,153,936 A | * | 5/1979 | Schmitz et al. ............. 700/296 |
| 4,541,094 A | * | 9/1985 | Stiffler et al. ................. 714/53 |
| 5,469,150 A | * | 11/1995 | Sitte .......................... 340/3.42 |
| 5,726,541 A | * | 3/1998 | Glenn et al. .................. 318/16 |
| 5,784,547 A | | 7/1998 | Dittmar et al. |
| 5,825,135 A | * | 10/1998 | Chang ......................... 315/291 |
| 6,466,539 B1 | * | 10/2002 | Kramer et al. ............. 370/216 |

OTHER PUBLICATIONS

Jens–Ulf Pehrs, Hans–Christian Reuss, "CAN—das sichere Buskonzept", *Elektronic* No. 17, Aug. 20, 1991, pp. 96–101.

* cited by examiner

*Primary Examiner*—Brian Zimmerman
*Assistant Examiner*—Clara Yang
(74) *Attorney, Agent, or Firm*—Dennison, Schultz, Dougherty & MacDonald

(57) ABSTRACT

A safety-oriented control system with a plurality of decentralized stations is disclosed. The safety-oriented control system is provided with inputs and outputs and at least one centralized station exchanging information with each other via a bus line, wherein at least one of the decentralized stations has independent devices for fault-tolerating and/or fault-controlling self-monitoring to ensure normal operation for linkage and evaluation of signals located at the inputs and outputs of this station or further stations, and devices for processing of the signals and for generation of independent control commands.

27 Claims, 11 Drawing Sheets

SECURITY CONTROL SYSTEM, METHOD FOR THE OPERATION THEREOF

BACKGROUND OF THE INVENTION

The invention relates to a method for operation of a safety-oriented control system with a plurality of centralized and/or decentralized stations provided with inputs and/or outputs and exchanging information with each other via a bus line, and to a safety-oriented control system for performance of the method.

A control system for interlinking of subsystems in motor vehicles is known from a specialist essay by J. U. Pehrs et al. *"Das sichere Buskonzept"* (the safe bus concept) in ELEKTRONIK, 17/1991, pp. 96–100. Here safety-relevant information such as braking, steering and engine data are transmitted to a central unit and processed there. The control system is designed as a bus system, with all the stations of the bus having a programmable control unit in the microcomputer with an integrated CAN controller. The task of the microcomputer with integrated CAN controller is to control bus line faults. By these are understood short-circuits or breaks in the bus line which impair or prevent communication of the nodes of the network.

The system described is designed exclusively for the recognition of bus faults in the event of short-circuits or breaks. It does not provide any indication of how the information such as such as braking, steering and engine data are processed within the microcomputer or how the data are exchanged between the stations of the bus with a central unit.

EP 0 732 657 A1 describes a method for fault-tolerant communication under high real-time conditions. The communication takes place in a local network, with a double bus architecture being used for fault reporting and for toleration of global bus faults. In one of the redundant bus systems all process data are transmitted in fault-free operation, and status information in the other bus system. The double-bus architecture does however involve greater assembly work and cost expenditure.

Also known from the prior art are control systems designed as bus systems. On the one hand, the bus systems are designed as so-called "master/slave systems", with a centralized station as the "master" and decentralized stations as the "slaves". In this case, the slaves are connected for example to signal transmitters and/or actuators whose states are transmitted via a bus line to the master. The control linkage of the input signals to corresponding output signals is performed in the centralized master, which in turn has outputs or controls decentralized outputs in order to operate a control-engineering facility.

On the other hand, "multi-master systems" are also known in which both centralized and decentralized stations are designed as masters. In this case, the control linkage of the input signals to corresponding output signals in the decentralized stations takes place with one or more masters. It is also possible to assign higher-order coordinating control functions to a centralized master station.

The bus systems described are not however safety-oriented systems. For the transmission of safety signals, only buses or bus systems that are fault-tolerating or fault-controlling can be used, e.g. of redundant design. Safety signals are those for safety purposes or duties for preventing or rapidly rectifying dangerous states for personnel or damage to plant equipment. A redundant bus system meeting the safety requirements comprises for example two identical bus systems that both evaluate the safety signals and check them for identity using a fail-safe comparator. In a bus system of this type, faults are detected by the evaluation. In the event of a fault, i.e. in the event of differences in the evaluated states, a system shutdown takes place, as a result of which machinery, production plant etc. is brought to a state which poses no risks to personnel or plant parts. The differences must be detected within a fault reaction time of—for example—20 msecs and also lead within this time to an emergency shutdown of the electrical equipment, this emergency shutdown corresponding to a safety-oriented control command.

A completely duplicated bus design requires not only a duplicated two-channel design of the bus modules for the sensors and actuators and two bus masters for system monitoring and fail-safe shutdown, but also the laying of two independent cabling systems.

The signal processing in safety circuits as a rule comprises the functions "signal transmission", "signal linking/signal evaluation" and "processing to a control command".

The functions "signal linking/signal evaluation" and "processing to a control command" of a safety circuit are traditionally of centralized design here. For example, the signal linking/signal evaluation and the processing to a control command for emergency-off command devices, locking devices for movable protective equipment etc. is performed centrally in one or—for larger machines, production systems or in complex facilities—several switchgear cabinets.

Here all input signals from the safety circuit are first transmitted, linked and processed to control commands regardless of the type of transmission, said control commands then having to be decentralized again in order to shut down a drive unit, for example, that powers a dangerous movement.

On that basis, the problem underlying the present invention is to develop a safety-oriented control system such that the reaction times of the control system to fault signals and input signals are shortened.

The problem is solved in accordance with the invention in that a message content in the form of logic links between inputs and outputs of the respective station is filed in at least one decentralized and/or at least one centralized station and in that a comparison is made between the message content and a data block transmitted via the bus line and having a message content and an action is activated when a predetermined pattern is obtained between the message content of the data block and the filed message content.

In processes in which a CPU such as a microcomputer is involved, the interaction of computer power and program size is crucial for the reaction speed of the overall system. If for example the state of an input of a station is inquired, the next inquiry would only be made in the next run of the program, as a result each input in the system is inquired after each cycle time of a program run. In safety-oriented systems, logic linkages are generally assigned to certain inputs and in turn act on outputs that trigger a safety shutdown. The reaction time of the system corresponds to the time from actuation of a switching element leading to a input state change, to switching of the respective output.

To achieve a minimization of the reaction time in the event of a requirement, it is necessary that the outputs within a bus system initiate an independent shutdown without the shutdown of a higher-order control system being initiated. The outputs react directly and independently to safety-relevant state changes effected at the bus by input state changes. The direct reaction of the outputs is preferably to state changes which would lead to shutdown of the releases.

SUMMARY OF THE INVENTION

For this reason, it is provided that the programmable control unit is coupled to the bus line via a coupling element such as a CAN controller, where the programmable control unit is assigned a memory element with information or message contents for activating outputs and/or inputs, and where at least one input and/or output can be activated depending on a comparison of the information filed in the memory element with the in formation transmitted to the bus.

To make this possible, the respective stations are informed before system commissioning of the bus to which message contents or information which release, i.e. which output, is to be switched off. As a result, there are in the memories of the respective output station tables containing the message contents that are to lead to shutdown of the respective releases. Of course the memories can also contain information for the switching on of outputs. The function of the higher-order control remains intact. Only an additional shutdown path/switch-on path is integrated into the system.

The method is performed by a control system characterized in that at least one of the decentralized stations has independent devices for fault-tolerating and/or fault-controlling self-monitoring to ensure normal operation for linkage and evaluation of signals located at the inputs and outputs of this station or further stations, and devices for processing of said signals and for generation of independent control commands, in that the independent device is coupled via a coupling element to the bus line, in that the independent device has a memory element for a message content in the form of logic links between inputs and outputs of the respective station and in that the independent device has a comparator for performing a comparison between the message content and a data block transmitted via the bus line.

In other words, a safety-oriented control system is achieved that comprises a plurality of decentralized input and output stations or combination input/output stations. The stations are in each case so designed that the function "signal linking/signal evaluation" and/or the function "processing to a control command" can take place decentrally. The stations can here—depending on their design—be provided as built-in switchgear cabinet devices or as field-suitable stations. In contrast with control systems according to the prior art, where signal linkage and processing to a control command takes place in centralized safety control devices accommodated in one or more switchgear cabinets, in the safety-oriented control system in accordance with the invention decentralization of the generated control commands is not necessary. To that extent, functions such as self-diagnosis, monitoring and the control functions mentioned above can be performed decentrally. A particular advantage to be mentioned here is that the transmission medium arranged between the stations is relieved of superfluous data transfer.

Centralized functions are reduced to a minimum, i.e. this function is used only for programming or parameterization of the system, for system administration (e.g. how many and which stations are connected to the system), for safety-oriented monitoring of the bus line, and for a higher-order safety function when interdependent input and output information sets are separated from one another spatially, i.e. in two different stations.

A higher-order centralized station as bus-master station can here assume pure monitoring functions, and in the event of a fault transmit shutdown signals to the decentralized master stations and/or to connected devices.

In a preferred embodiment, it is provided that the stations have a redundant design with two independent and galvanically isolated part-systems/nodes or channels. In a further preferred embodiment, it is provided that the redundant part-systems each have independent software packages with differing program structure for performance of the same computation. The redundant hardware design of the stations ensures that in the event of a danger-involving failure or disruption in one of the channels involved the other channel (s) can continue to maintain the safety function.

The hardware-based and/or software-based multi-channel feature is furthermore used to ascertain whether one of the channels involved is defective, by comparison of the desired valency or antivalency of the channels with one another. If the comparison shows a difference, a predetermined fault-controlling and/or fault-tolerating response of the system follows. In the case of a fault-controlling failure response, which is preferred in particular for the safety of machines and machine controls, shutdown is preferred in the event of a fault. With a fault-tolerating failure response, which is preferably used in aircraft, transport systems and process technology installations, non-shutdown is preferred in the event of a fault.

Furthermore, both safety-oriented fault-controlling operating methods and safety-oriented fault-tolerating methods are possible. Here "safety-oriented fault-controlling" relative to the requirements placed on the safety of machines and machine controls means that depending on a risk assessment a distinction is made between different control categories. In the case of a safety-oriented fault-tolerating mode of operation, a fault in any part of the safety-oriented control system does not also entail loss of the safety function, although the occurrence of the fault must not lead to shutdown of the system, instead the function of the other channels is sustained.

To design the "control engineering intelligence", it is provided that at least one of the decentralized stations has at least one programmable control unit such as a microcomputer that assumes the functions of signal transmission, signal reception and evaluation as well as processing of the signals to control signals. In the case of two-channel stations, one programmable control unit is provided per channel.

The centralized and/or decentralized stations are preferably linked to one another by a bus line such as a CAN bus line, with this bus being designed as a line and extending between a bus start station (central station) and a bus end station (dezentral station), and with further dezentralized stations having a bus input and a bus output being incorporated into the bus line. It is provided here that the stations exchange information with one another, where one station provides the bus with information on the basis of a state change to the input, which is read and evaluated by at least one further station and where the stations perform independently assigned control functions depending on the information received. As a result a decentralized intelligent control system is provided in which all bus stations can locally perform self-diagnostic, monitoring and control functions in decentralized form.

In a further advantageous embodiment, the bus start station can be designed as a master station that assumes higher-order bus control functions.

Particularly advantageous is that signals are exchanged between the intelligent bus start station and the bus end station in order to detect faults of the bus line.

It is furthermore preferably provided that the bus line has a total of four conductors, two of which are used for power supply and two others for data transmission.

Particularly advantageous is also that the stations are supplied with AC voltage, with each channel of a station being assigned a separate power pack.

Each power pack here has its own transformer, so that the two channels are operated with isolated potentials.

At least one of the stations, preferably the bus start station (master station), is connected to an external isolation transformer for generating the supply AC voltage. The supply AC voltage is in the range from 20 to 50 V AC, preferably 42 V AC.

For mutual checking of the channels or nodes, the programmable control units assigned to the channels, such as microcomputers, are serially linked to one another via a galvanically isolated interface.

For communication with a higher-order control unit, at least one station has a serial interface such as an RS 232 or CAN interface. For programming of the system, at least one station has a further interface such as an RS 232 interface.

It is also provided that at least the bus start station (master station) and at least the bus end station each have units for generating preferably periodic bus messages or bus signals and devices for receiving bus messages or bus signals, with a safety-oriented control command being generated within a certain period if there are no bus messages.

In order to achieve an immediate bus shutdown in the event of a fault, the microcomputers of a station are each connected to an electromechanical switching unit such as a relay to perform a higher-order shutdown function.

BRIEF DESCRIPTION OF THE DRAWINGS

Further details, advantages and features of the invention are shown in the following description of a preferred embodiment shown in the drawings.
In the drawing.

DETAILED DESCRIPTION OF THE INVENTION

Figure 1:
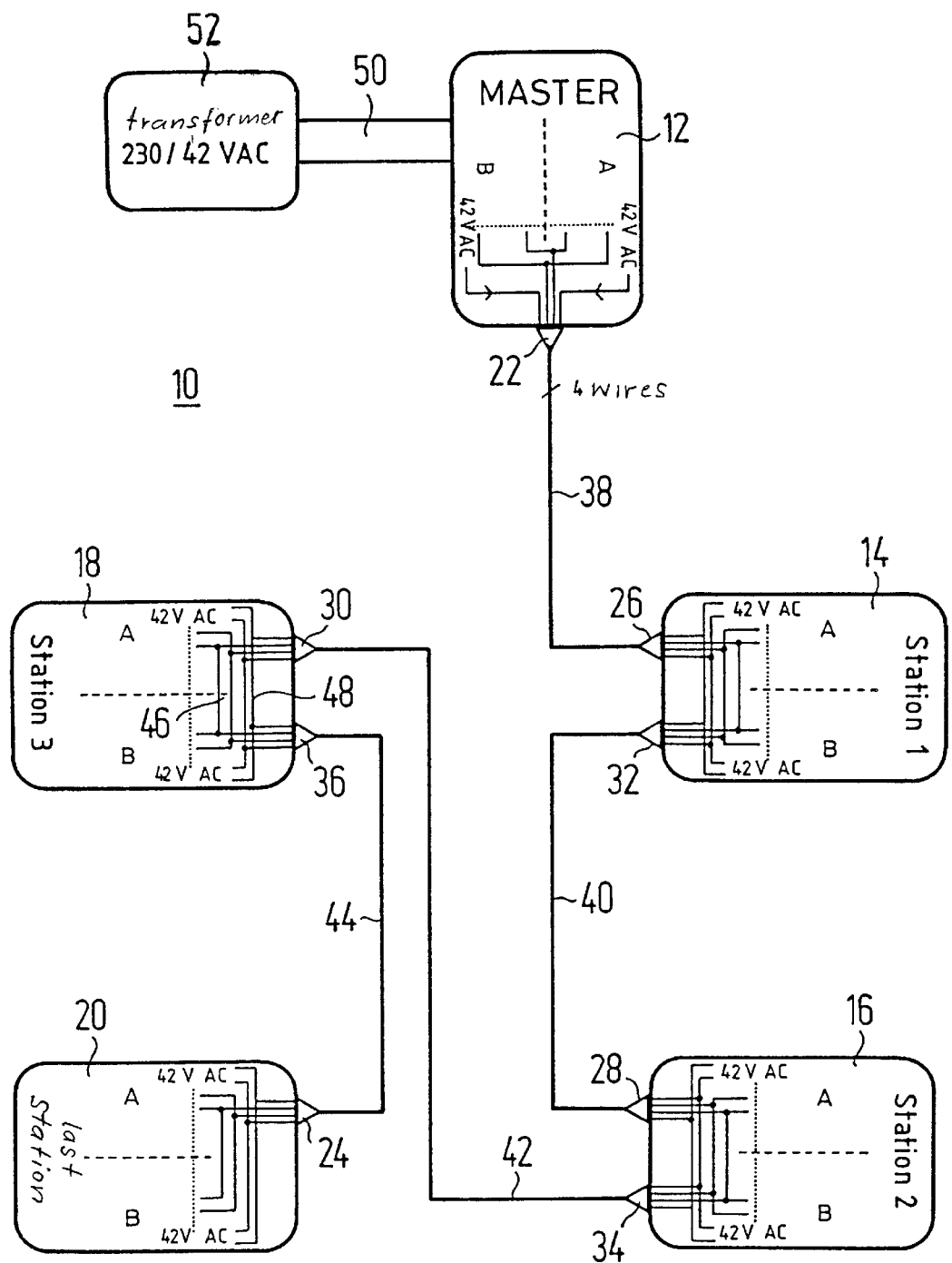
FIG. 1 shows the design principle of a safety bus system.

FIG. 1 shows a safety-oriented control system 10 which in the design example shown here is designed as a line-like bus system. The bus system has a plurality of interconnected centralized and/or decentralized stations 12, 14, 16, 18, 20 provided with inputs and/or outputs. Here the first station 12 is designed as a bus start station or bus master with a bus connection 22, and a last station 20 is designed as a bus end station with a bus input 24. The further stations 14, 16, 18 have a bus input 26, 28, 30 respectively and a bus output 32, 34, 36 respectively. A single-channel bus line 38, 40, 42, 44 is arranged between a bus output 22, 32, 34, 36 of a bus station and a bus input 26, 28, 30 respectively. In this way, the bus system 10 can have a line with up to 64 stations.

The transmission medium or the single-channel bus line 38, 40, 42, 44 comprises a data line 46 and an power supply line 48. Here both the data line and the power supply line are here designed with two conductors.

For power supply, the bus master 12 is connected via a power line 50 to a transformer 52 which in turn is connected to mains voltage and provides a safe-to-touch supply AC voltage of preferably 42 V AC. Both the data line 46 and the power supply line 48 are internally incorporated through inside the stations having the bus inputs and outputs 26, 32; 28, 34; 30, 36. As a general principle, each station 12, 14, 16, 18, 20 of the bus system 10 has two part-systems or nodes A, B independent of one another and referred to in the following as channel A and channel B. With the two-channel design, a redundant system is achieved. Here each channel A, B within the station 12–20 has the possibility of independently accessing the bus 38–44. In other words, each channel A, B works independently to the multi-master principle. As a general rule, the stations 12–20 have a substantially identical hardware structure.

Figure 2:
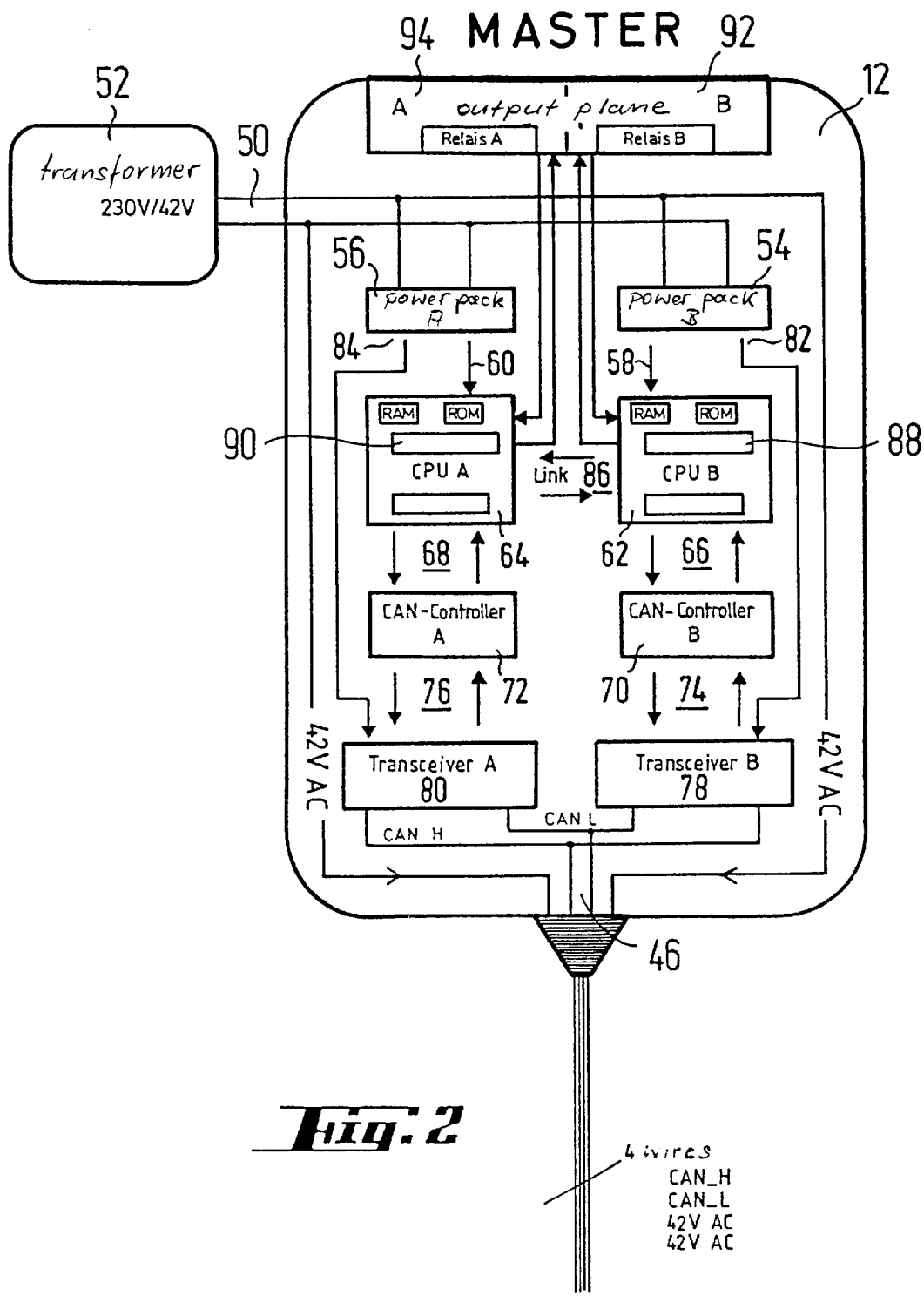
FIG. 2 shows the design principle of a master station with two channels.

FIG. 2 shows the design of the bus master 12. The channels A and B each have a power pack 54, 56 connected on the input side to the power line 50. A first output 58, 60 of the power pack 54, 56 is connected to a programmable control unit 62, 64 such as a microcomputer. The microcomputers 62, 64 are connected via lines 66, 68 to bus controllers 70, 72 that are connected via further lines 74, 76 with bus couplers 78, 80 to the bus data line 46. The bus couplers 78, 80 have a separate voltage supply and are connected to a second output 82, 84 of the power pack 54, 56.

Via a connecting line or link 86 between the microcomputers 62, 64 a data exchange takes place between the channels A and B for mutual checking. This is a galvanically decoupled serial interface. Furthermore, serial interfaces 88, 90 such as RS 232 or CAN interfaces are provided in the microcomputers 62, 64 and are connected via a connecting line with an output plane 92 or the channel B and an output plane 94 of the channel A in order to provide a connection to an external programming unit such as a personal computer for programming of the bus system. It is also possible to provide other interfaces for coupling to other bus planes. The output planes 92, 94 each have up to eight semiconductor outputs.

Figure 3:
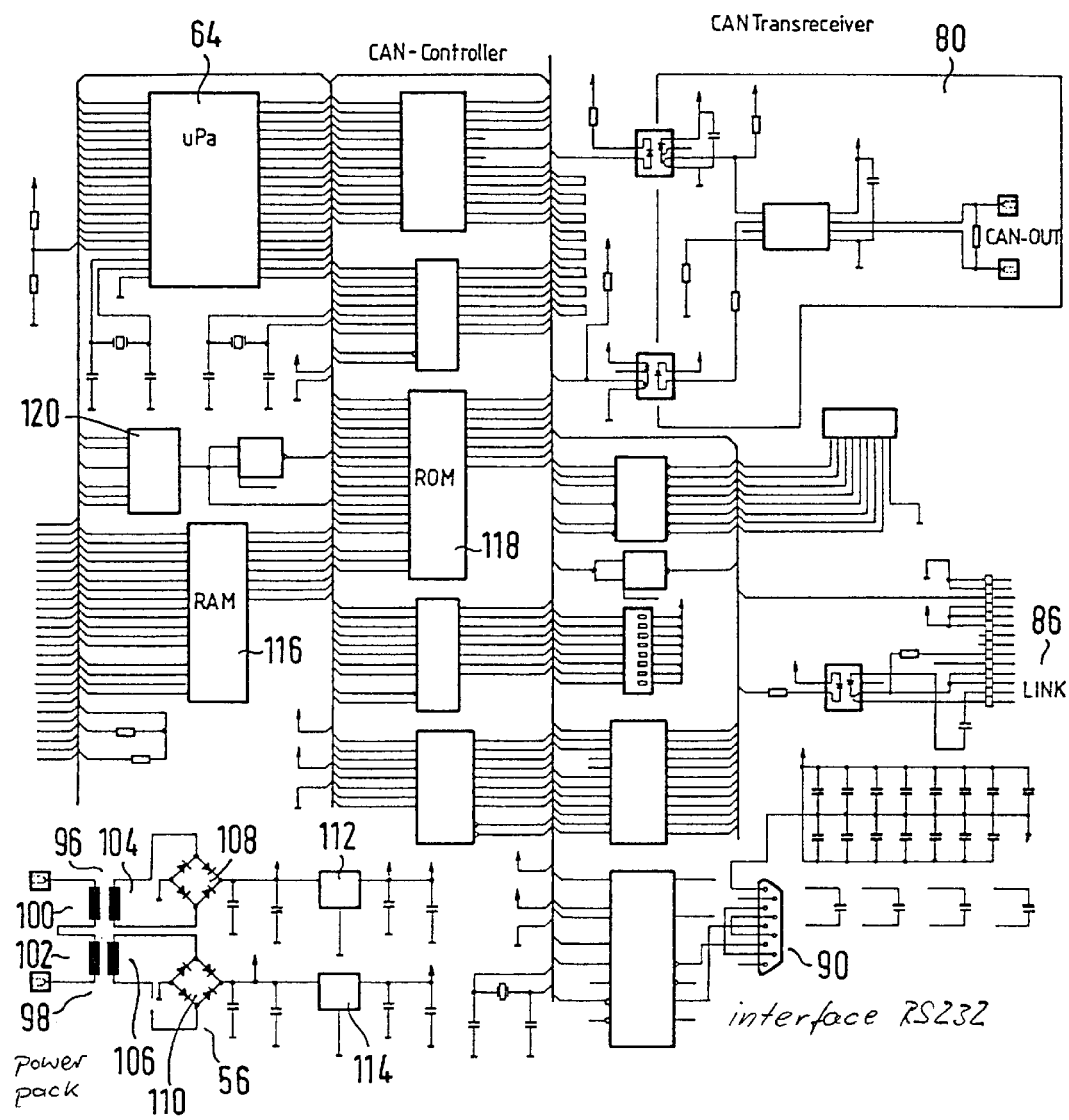
FIG. 3 shows a circuit design of a first channel of the master station according to FIG. 2.

FIG. 3 shows in detail a circuit design of channel A of the master station 12 according to FIG. 2. Here channel A has a circuit layout per se typical for the prior art. The power pack 56 comprises two transformers 96, 98 whose primary windings 100, 102 on the primary side are connected in series to supply voltage. The transformers 96, 98 have a secondary winding 104, 106 respectively which via a rectifier 108, 110 and a voltage regulator 112, 114 respectively provide a regulated output voltage for the microcomputer 64 or for the bus coupler 80. The microcomputer 64 furthermore has external memory modules 116, 118 such as RAM and ROM and a watchdog 120. The two microcomputers 62, 64 of the master station 12 can access the bus 38, 40, 42, 44 independently of one another via the bus coupler 78, 80 respectively. A data exchange for checking purposes is possible via the link 86. The connection is optoelectronically decoupled.

The mains voltage of $U_N$=230 V AC is transformed to a supply voltage of $U_V$=42 V AC by the centralized power transformer 52. The supply voltage $U_V$ is applied to the input of the power pack 54, 56 and is connected to the input windings of the transformers 96, 98. A voltage of approx. 8 V AC is connected to the output windings 104, 106 and is limited by the rectifier 108, 110 and assigned voltage regulators 112, 114 respectively to approx. 5 V. The voltage is monitored using the watchdog 120.

The ROM module 118 is used for storage of the firmware. The ROM module 118 is designed as an EPROM and is cyclically checked with the aid of a 16 bit check sum formation (CRC check). User-specific data are stored in a flash-EPROM. The flash-EPROM is programmed via the serial interface 90. The user data can be transferred with the aid of a switch and various saving mechanisms. The flash-EPROM is checked with the aid of the CRC check described above.

The external RAM 116 is provided additionally to a processor-internal RAM. This RAM module 116 incorporates a real time clock (RTC). An external RAM is also provided for the microcomputer 62, albeit without RTC.

Figure 4:
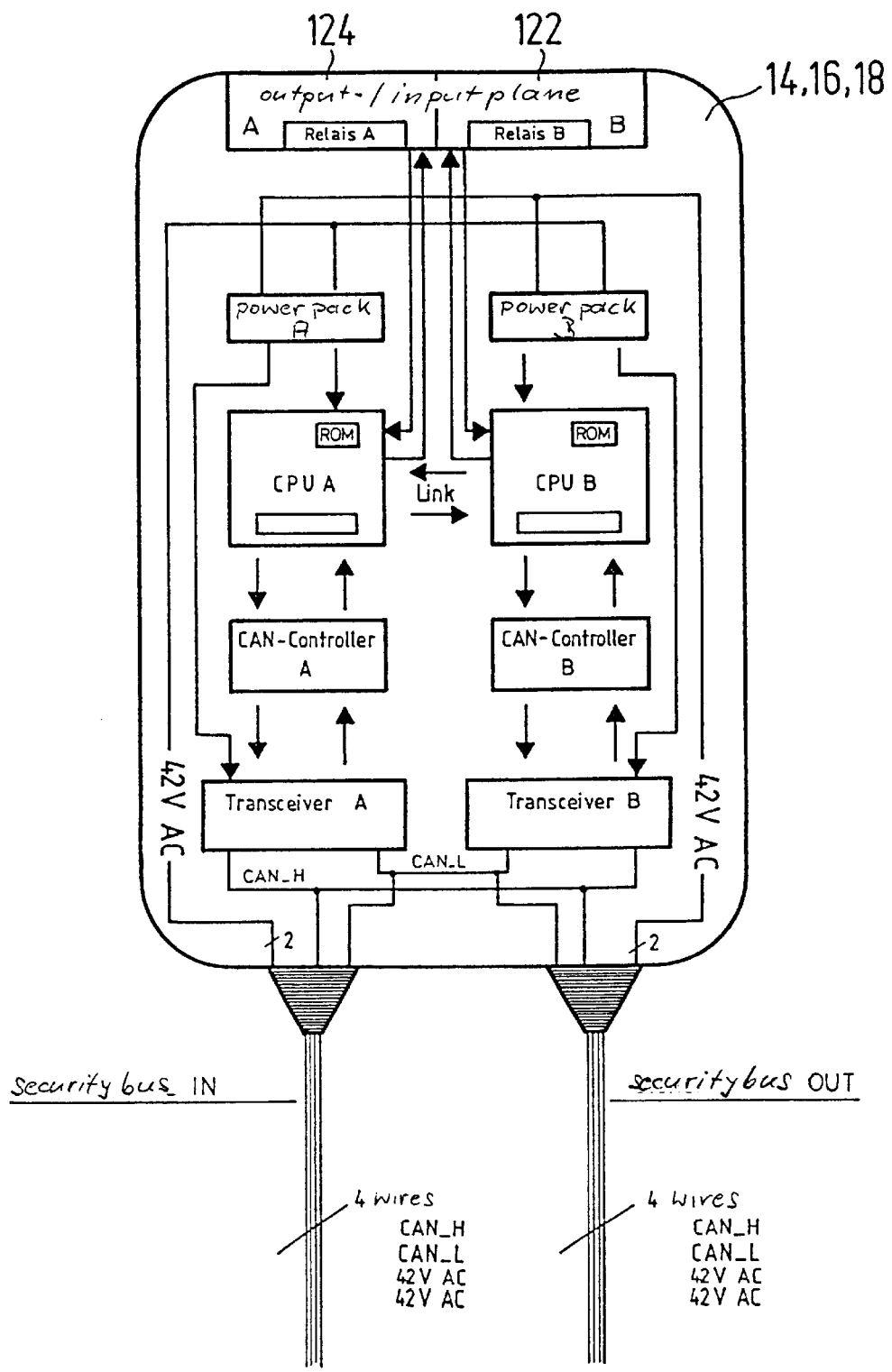
FIG. 4 shows the design principle of an input and/or output station.

FIG. 4 shows as an example the layout of one of the stations 14, 16, 18. The stations 14, 16, 18 have substantially the same internal structure as that of the master station 12. A main difference is in the provision of an input and/or output plane 124. In this way, the bus stations can be designed as bus output stations with up to eight semiconductor outputs or as bus input stations with semiconductor inputs to which one to four emergency-off switches or optionally one to eight control devices such as locking or unlocking devices are connected. The contact elements are attached to a terminal and internally—separated by optocouplers—connected to the inputs of the two microcomputer systems. For checking the lines for short-circuit, the lines are periodically subjected to signals for testing.

Figure 5:
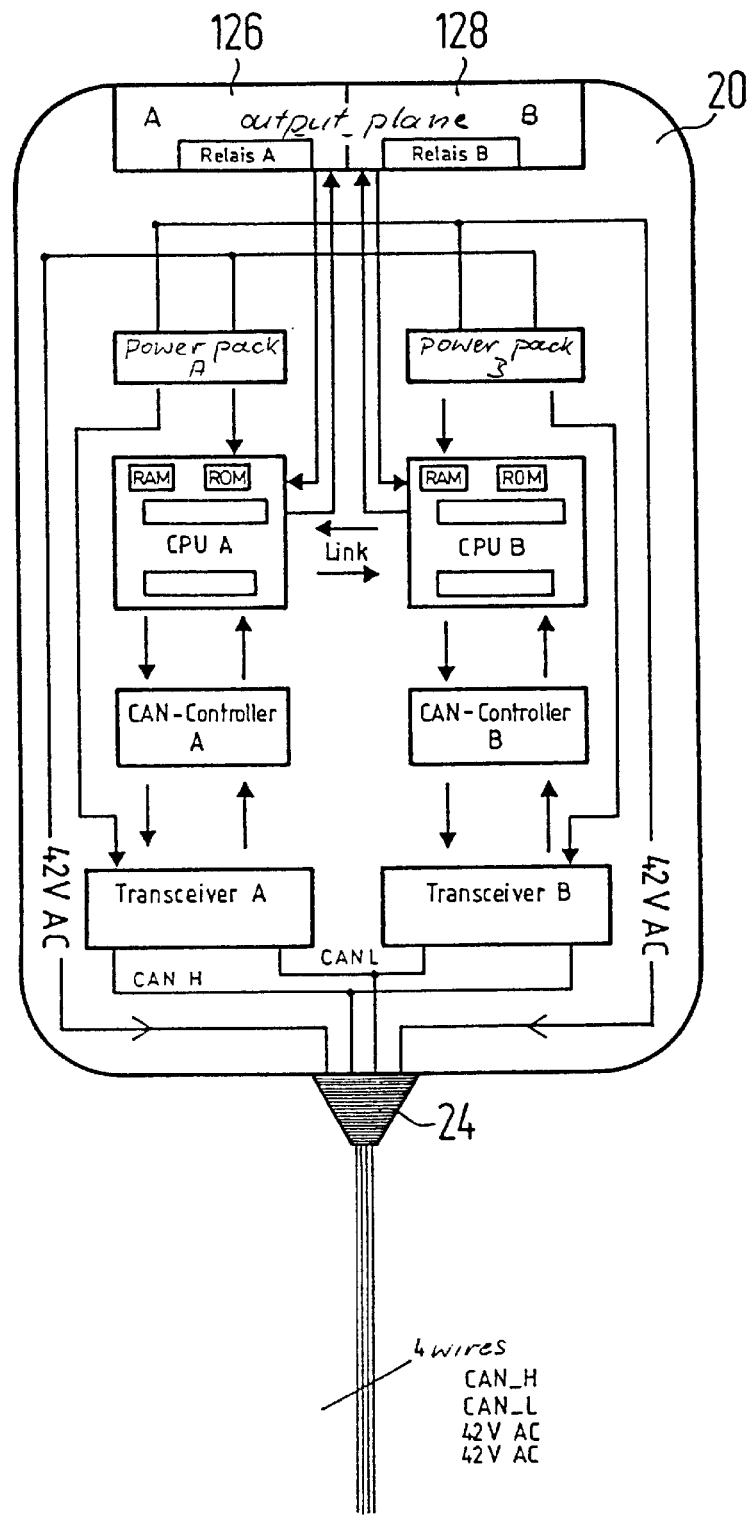
FIG. 5 shows the design principle of a bus end station.

FIG. 5 shows a layout of the bus end station 20. Unlike in the bus stations 14, 16, 18, the bus end station has only the bus input 24 and no further bus output. The bus end station 20 can also have inputs and/or outputs 126, 128. The technical function of the bus end station 30 is explained later on.

Figure 6:
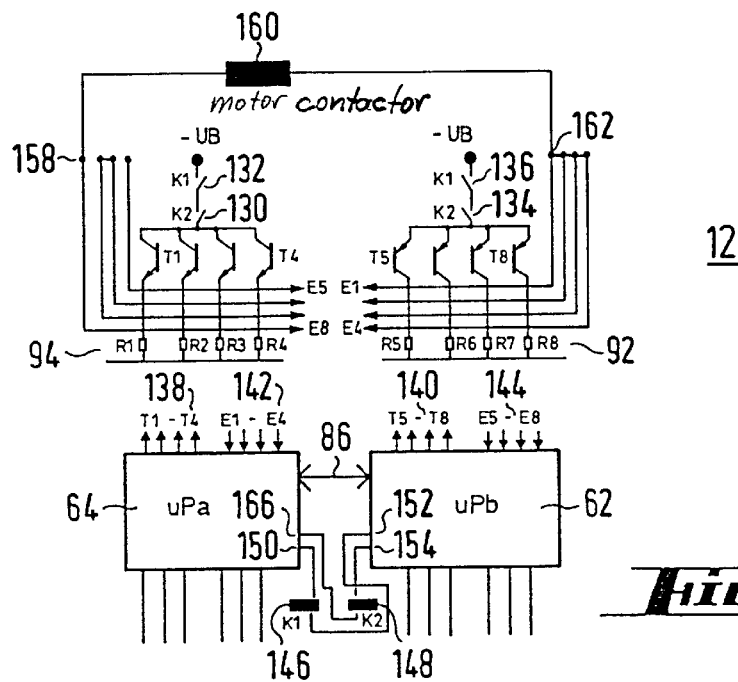
FIG. 6 shows a circuit design of a safety circuit.

FIG. 6 shows as an example a circuit design of the output plane 92, 94 of channels A, B of bus master 12. Here the output plane 94 of channel A comprises a plurality of NPN transistors T1–T4 connected on the emitter side via resistors R1–R4 to reference potential. On the collector side the transistors T1–T4 are connected via two series-connected N/O contacts 130, 132 to positive operating voltage $U_B$.

The output plane 92 of the channel B has a plurality of PNP transistors T5–T8 that are connected to one another on the emitter side and connected to negative operating voltage $U_B$, via two series-connected N/O contacts 134, 136. On the collector side the transistors T5–T8 are connected via resistors R5–R8 to reference potential. For control of the transistors T1 to T4 the microcomputer 90 has outputs 138 that are connected to a base of the transistors T1–T4 preferably by optocouplers. The microcomputer 62 too has corresponding outputs 140 with which the transistors T5–T8 can be controlled. For monitoring of the switching functions of the transistors T1–T4 on the one hand and of the transistors T5–T8 on the other hand, the microcomputer 64 has inputs 142 connected to outputs E1–E4 of the transistors T5–T8. The same applies for the microcomputer 62, which has inputs 144 connected to outputs E5–E8 of transistors T1–T4. All connections between the microcomputers 64, 62 are preferably galvanically isolated via optocouplers (not shown).

Furthermore, the circuit comprises two relays 146, 148, where the relay 146 is connected by a first connection to an output 150 of the microcomputer 64 and by a second connection to an input 152 of the microcomputer 62. Accordingly, the relay 148 is connected by a first connection to an output 154 of the microcomputer 62 and by a second connection to an input 156 of the microcomputer 64.

The output 158 of the output plane 94 is connected to a winding 160 of an electromechanical switching element such as a motor contactor, which in turn is connected by a further connection to the output 162 of the output plane 92. If due to control commands of the microcomputers 62, 64 the transistors T1 and T5 are switched to conducting and if the relays 146, 148 have picked up, the motor contactor 160 is provided with current and picks up.

To ensure dependable operation of this circuit array, the relays 146, 148 are designed as positively-driven relays that at the moment of switch-on are electrically interlocked with one another in a time window. The relays 146, 148 are directly controlled via a transistor by a microcomputer 62, 64 respectively. The connection of the relay contacts 130, 132, 134, 136 of the positively-driven relays 146, 148 corresponds to a "reliable comparator".

Of course it is also possible for further stations 14, 16, 18 to have outputs for control of various actuators. It is provided here that each output station 122, 124 has eight N-switching and eight P-switching transistors.

Figure 7:
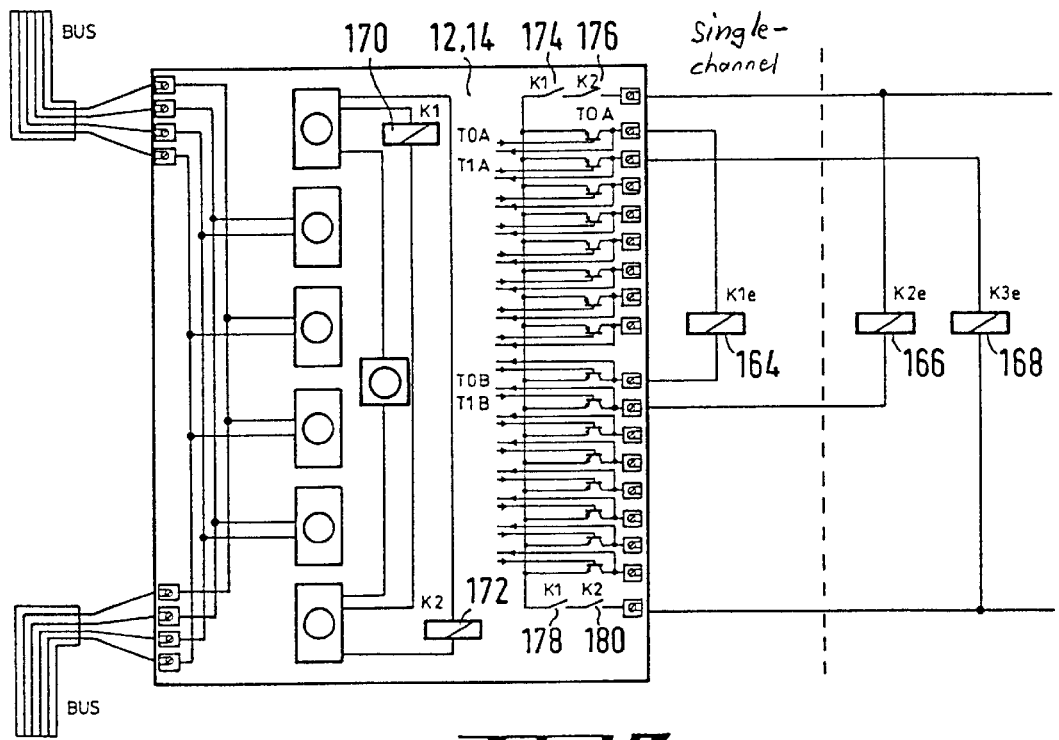
FIG. 7 shows a bus output station with external wiring.

FIG. 7 shows a corresponding bus output station 14 which is optionally connected to an external consumer 164 in single-channel design or where two consumers 166, 168 form a redundant connection.

With the single-channel connection method, the electrical consumer 164 is connected by its first connection to an output of a transistor of channel A and by a second connection to an output of a transistor of channel B. The first connection of the consumer 164 is connected to positive operating voltage via the transistor of the channel A and the N/O contacts 130, 132, and a second connection of the consumer 164 is connected to negative operating voltage via the transistor of the channel A, B and further N/O contacts 134, 136.

With the redundant embodiment of the consumer, the first consumer 166 is connected by a first connection to positive operating voltage and by a second connection via a transistor of channel B to negative operating voltage. By contrast, the second consumer 168 is connected by one connection to negative operating voltage and by a further connection via a transistor of channel A to positive operating voltage.

Figure 8:
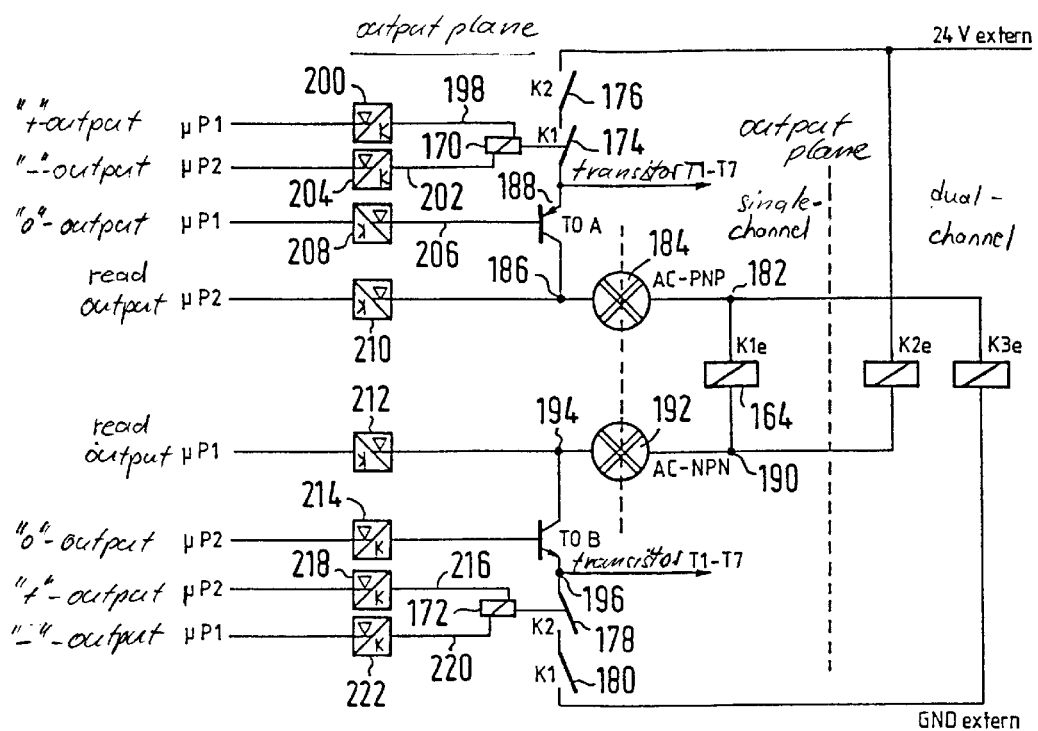
FIG. 8 shows a current path of the bus output station with external wiring according to FIG. 7.

To describe in principle the function of the circuits in accordance with FIGS. 6 and 7, a current path is shown in FIG. 8. With the single-channel operating mode, the consumer 164 is connect ed by a first connection 182 via a terminal 184 to a collector 186 of the transistor TOA. Its emitter is connected via the N/O contacts 174, 176 to positive potential of the operating voltage.

A second connection 190 of the consumer 164 is connected via a terminal 192 to a collector 194 of the NPR transistor TOB. An emitter 196 of the transistor TOB is connected via the N/O contacts 178, 180 to the reference potential of the operating voltage.

As already set forth in respect of FIG. 6, a first connection 198 of the relay 170 is controlled via an optocoupler 200 by an output of the microcomputer of channel A. A further connection 202 of the relay 170 is connected via an optocoupler 204 to an output of the microcomputer of the channel B. A base 206 of the transistor TOA is connected via an optocoupler 208 to an output of the microcomputer of channel A. For checking or monitoring of the output 184 or of the function of the transistor TOA, the collector 186 is connected to an output of the microcomputer of channel B via an optocoupler 210 for read back.

The same applies for the output plane of channel B. Here the output 192 or the collector 194 is connected via an optocoupler 212 to an output of the microcomputer of channel A for readback. The transistor TOB is controlled via an optocoupler 214 and an output of the microcomputer of channel B. The relay 172 is also connected by a first connection 216 via an optocoupler 218 to a positive output of the microcomputer of channel B and by a second connection 220 and an optocoupler 222 to a negative output of the microcomputer of channel A.

After each channel A, B has performed a self-test after switch-on, the relays 10, 172 are controlled by the microcomputers of channel A and channel B. The N/O contacts 176–180 switch the externally applied voltage through to the not yet actuated output transistors TOA, TOB. If a release signal is given by both microcomputers of channel A, channel B, the transistors TOA, TOB are also activated and the current path for the externally connected consumer 164 is closed.

In operation, the outputs 184, 192 are tested by the microcomputer of channel A briefly switching off the associated output transistor TOA. The time of the short-term shutdown must be shorter than the reaction time of the connected consumer, in order to avoid any reaction to the brief current interruption. Via the readback path 210 the microcomputer of channel B receives the information on whether the output transistor TOA has really fulfilled its function. If it has not correctly fulfilled this function, the microcomputer of channel B would force its higher-order safety relay 172 to shut down.

By shutdown of the relay 172, the relay 170 is electrically interlocked. In addition, a data exchange takes place by means of the switching behavior of the output transistors TOA, TOB via the transmission line 86 or "link" arranged between the microcomputers. These data are hence processed in parallel by two processors. The test function is then initialized by the microcomputer of channel B, where the checking function in this case is with the microcomputer of channel A.

Figure 9:
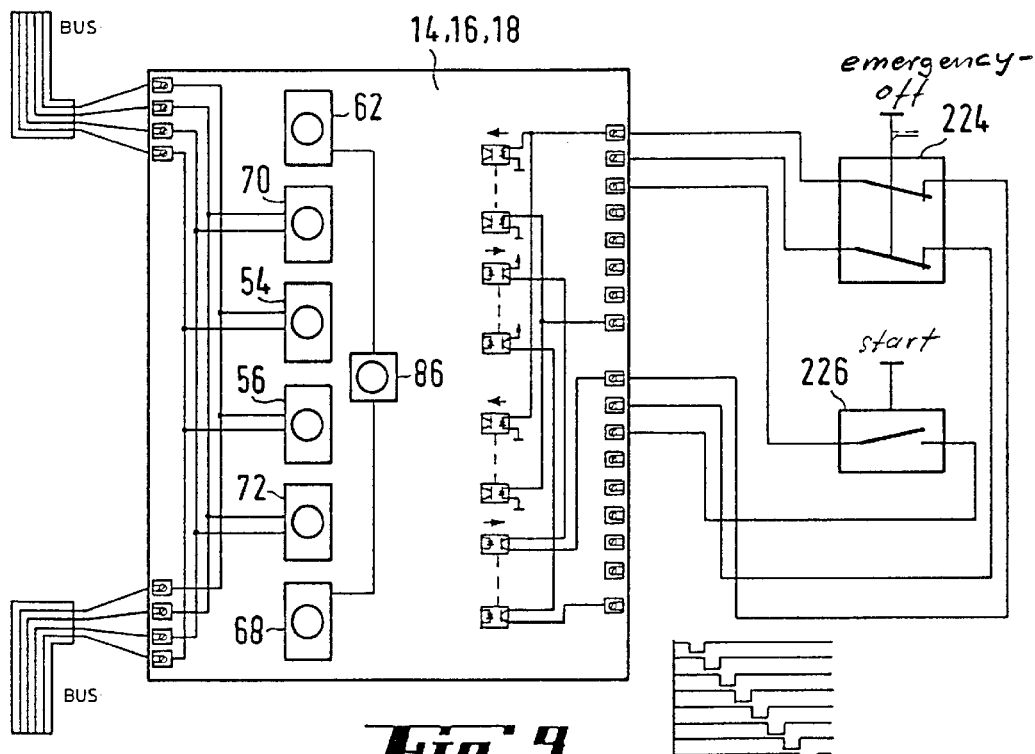
FIG. 9 shows a bus input station with external wiring.

FIG. 9 shows an external wiring of a bus input station 14, 16, 18. The bus input station has a hardware layout substantially corresponding to that of the master station 12. With the exception of the serial interface 88, 90 and the additional ROM module 116, the bus input station has microcomputers 62, 64 connected to one another via the link 86, also bus controllers 70, 72 and power packs 54, 56.

On the input side, both two-channel control devices 224 and emergency-off switches or single-channel control devices 226 such as start buttons can be connected.

Figure 10:
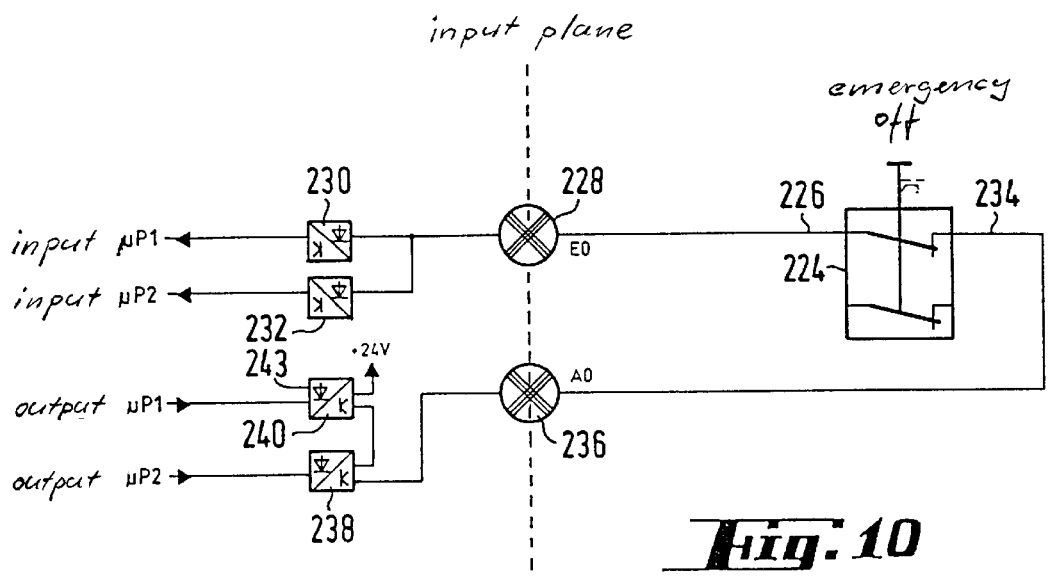
FIG. 10 shows a current path of the bus input station with external wiring according to FIG. 9.

The function of the circuit array is to be set forth on the basis of FIG. 10. Here the emergency-off switch 224 is connected using a first connection 226 and via an input terminal 228 on the one hand via an optocoupler 230 to an input of the microcomputer μP1 and on the other hand via an optocoupler 232 to an input of the microcomputer μP2. A further connection 234 of the emergency-off switch configuration is connected via an input terminal 236 to an optocoupler 238 that in turn is connected to an output of the microcomputer μP2. The optocoupler 238 has a transistor output that is connected via a further transistor output 240 of an optocoupler 242 to operating voltage. The transistor output 240 is controllable via an output of the microcomputer μP1.

The function of read-in is set forth in FIG. 10. The inputs 230, 232 are reading inputs of the respective microcomputer μP1, μP2. The outputs 242, 238 are writing outputs of the respective microcomputer μP1, μP2. For the optocouplers 230, 232 to be activated, the outputs of the microcomputers μP1 and μP2 must be set to actuate the optocouplers 242, 238, so that positive potential is applied at the output 236. If the microcomputer μP1 interrupts the current flow with the help of its output, the inputs of the microcomputers μP1 and μP2 must change their status. This also applies when microcomputer μP2 interrupts the current flow for testing.

In addition, a data exchange takes place via the link 86 to ascertain whether the respective input has fulfilled its function. If the control device 224 is actuated during testing, this information is made available to the first channel by a second channel of the switch 224 and the test is confined to the homogeneous state of the channels. This function is only active during testing. With the principle of input testing, a cross-wise test comparison is to be created for the input information.

Furthermore signal paths are shown in FIG. 9 that represent a short-circuit test of the inputs. All inputs are here reset briefly one after the other for <1 ms, with the respective input having to retain its status within this period of resetting for an output.

Figure 11:
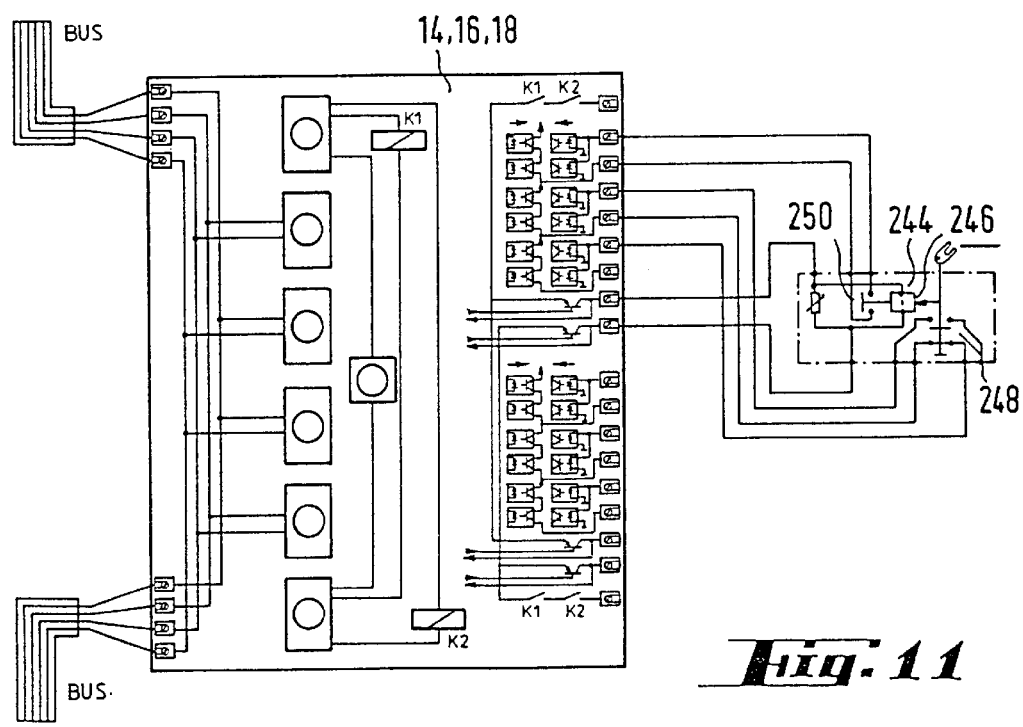
FIG. 11 shows an input and/or output station with external wiring using the example of a door monitoring station.
Figure 12:
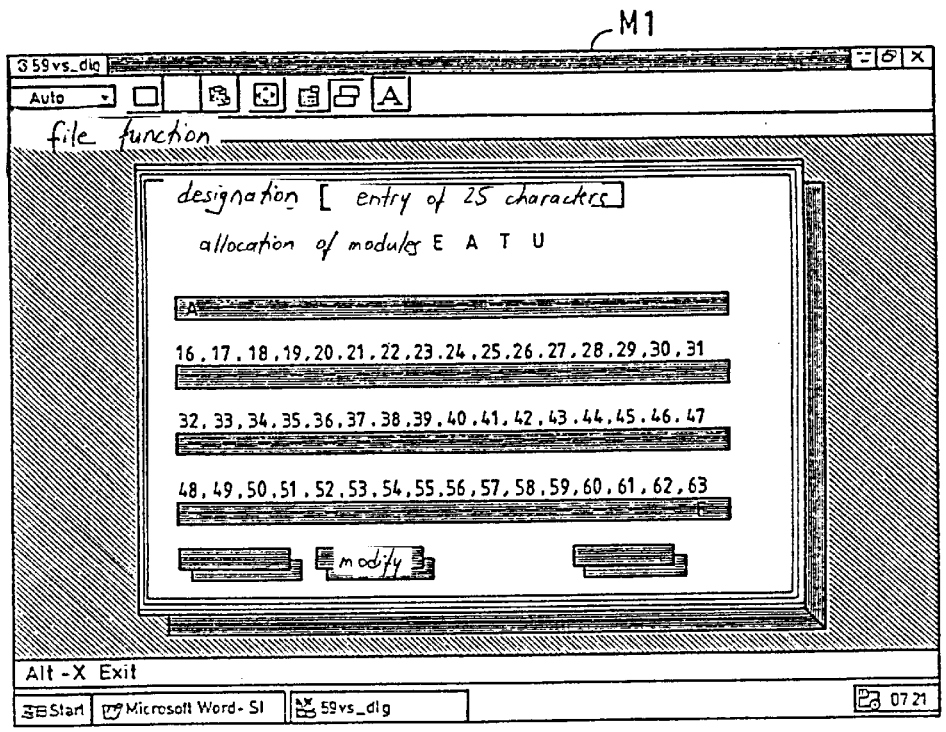
FIGS. 12–15 shows views of programming masks.

FIG. 11 shows a combination of bus output station and bus input station. The testing methods correspond to those of the respective individual stations explained with reference to FIGS. 6 to 10. In the design example shown here, a locking device with lock feature 244 is connected to the bus station 14, 16, 18 and has both active elements such as coils 246 and passive switching elements such as door/magnet contacts 248, 249. The active elements 246 are controlled via transistor stages, with the passive elements 248, 250 being inquired and monitored by optocouplers. In addition, it is possible using a transformer (not shown) integrated in this station to provide an AC voltage for actuation of the electrical consumer such as door magnet 146. Here too the specific advantage of supplying the individual stations with AC voltage becomes clear: on the one hand electrical consumers with DC voltage can be used by insertion of a simple rectifier with downstream smoothing or regulation, and on the other hand the voltage supply to AC voltage consumers is assured in simple fashion.

In particular it should be pointed out that the hardware is designed to avoid faults wherever possible. For this reason, two independent channels or function units A and B were integrated into each of stations 12–20 for performance of specified functions. The channels A and B are equally, i.e. homogeneously, redundant. The signals used or generated by both channels are continuously compared with one another for the purposes of fault recognition (comparison of relevant input and/or output signals). In this connection, the higher-order relay plane (fail-safe comparisons) explained in FIG. 6, the internal mutual comparison via the link 86, and an external comparison of the input data by the user should be pointed out in particular.

The RAM module 116 is tested with the aid of a software test, whereas testing of the ROM module 118 is limited to the signature formation of both modules and their comparison.

By the use of partially diversitary microcomputers (microcomputers having the same command set, but internally differing hardware structures), systematic hardware faults can be detected in some cases. Regardless of this, the microcomputers of both channels of a station continuously perform self-test functions in the background.

In accordance with the invention, communication between the bus start station or bus master 12 and the bus end station 20 is subject to time-related information. An absence of a message within a defined time window, e.g. 15 ms, leads to a total shutdown of the system. Alternatively, it is possible to exchange time-related information not only between the master and the bus end station 20, but also between a plurality of intelligent bus stations 14, 16, 18. This time-critical information exchange is restricted not only to the bus master 12 and the bus end station 20.

This measures ensures that an interruption of a bus line 38–44 can be detected within about 15 ms. The message content is subject to a change over time (counting-up method). With this measure, it is prevented that another station within the bus system can simulate the message of the master or bus end station.

An interruption within a station can only affect one channel in accordance with the usual fault consideration methods and with the PCB layout. As a result, the second fault occurrence time is taken as the basis for this fault type. This consideration results in the necessity that all channels in each station (except the master 12 and the bus end station 20) would have to report within one hour for example, depending on the safety requirements. In this way, the strain on the bus can be reduced to a dimension meeting the requirements as regards availability.

In the following, the user software on which the bus system 10 is based is to be explained. A user is given the possibility of adapting the control system to his circumstances. With the aid of a menu-controlled software, the user can assign inputs and/or outputs to the stations 12–20. This configuration software can be installed on any IBM-compatible system which has for example the MS-DOS operating system. The assignment of input and output planes is performed in a matrix-like form.

In accordance with the invention, function blocks are displayed to the user without the latter having access to the logic functions of these blocks. Function blocks concern for example the parameterization of commercially available protective devices, e.g. door tumblers, emergency-off command devices and similar, but also—for specific protective functions—the programming of logic functions such as AND, OR, NOT. The logic functions are not filed in the programming unit such as a PC, instead only the name of the function block, e.g. door tumbler, its number, options, input terminal numbers, output terminal numbers and comments are filed in the programming unit. The actual logic components realized in a relay module thanks to the internal wiring are filed as a macro in the memory module 118 such as an EPROM. The memory module is for example an integral part of the bus master 12.

The user can transmit data from the programming unit via the serial interface 90 to the bus master 12, for example. To provide the user with the possibility of incorporating his own non-safety-relevant actuators/sensors into the system, macros are additionally provided with simple logic functions such as "AND", "OR" and "NOT" that may only affect a firmly predetermined output area. With these functions, the user can use an input area, assign logic functions to the latter and make it affect predetermined outputs. Since the logic functions of these macros are filed only in the bus master 12, and the input variable block has been restricted to one address area and only predefined outputs may be used, the user cannot exert any influence on the safety-related program part of this data block.

FIGS. 12–16 show as examples programming masks using which the system is programmable. With the aid of a mask M1, it is stipulated at which point the respective stations 12–20 should be located inside the bus system 10. In the design example shown, a maximum expansion capacity is 64 bus stations. It is provided here that the bus master 12 and the bus end station 20 are already permanently set.

Figure 13:
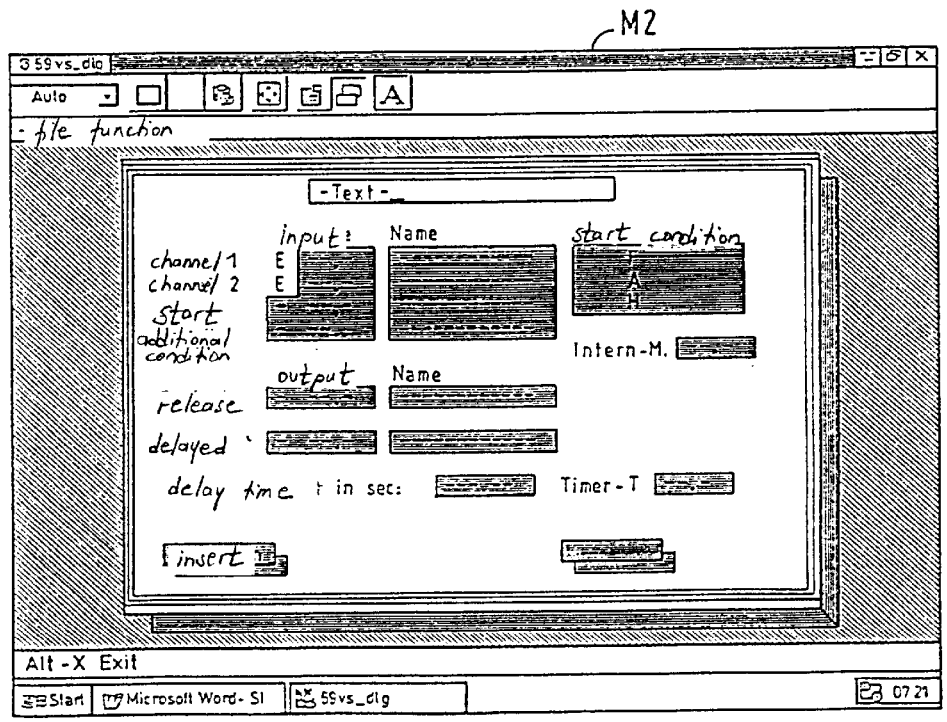

FIG. 13 shows a mask M2 for the emergency-off module. The mask M2 has a field "designation" into which a freely selectable name can be entered. Furthermore, a field "channel 1"/"channel 2" is provided, into which a terminal designation of the attached contact is entered. Also, a "Start" field is provided that describes the terminal of a start button. The "Additional conditions" field for example represents a feedback loop. In the field "Release" the required output is set when all conditions have been fulfilled. A further delayed-drop-out release signal is provided in a field "Delayed". The time-lag is settable here. The start condition can be effective automatically with a falling flank or with a rising flank. Within the scope of other applications, an automatic start could also be provided depending on the safety-related framework conditions.

Figure 14:
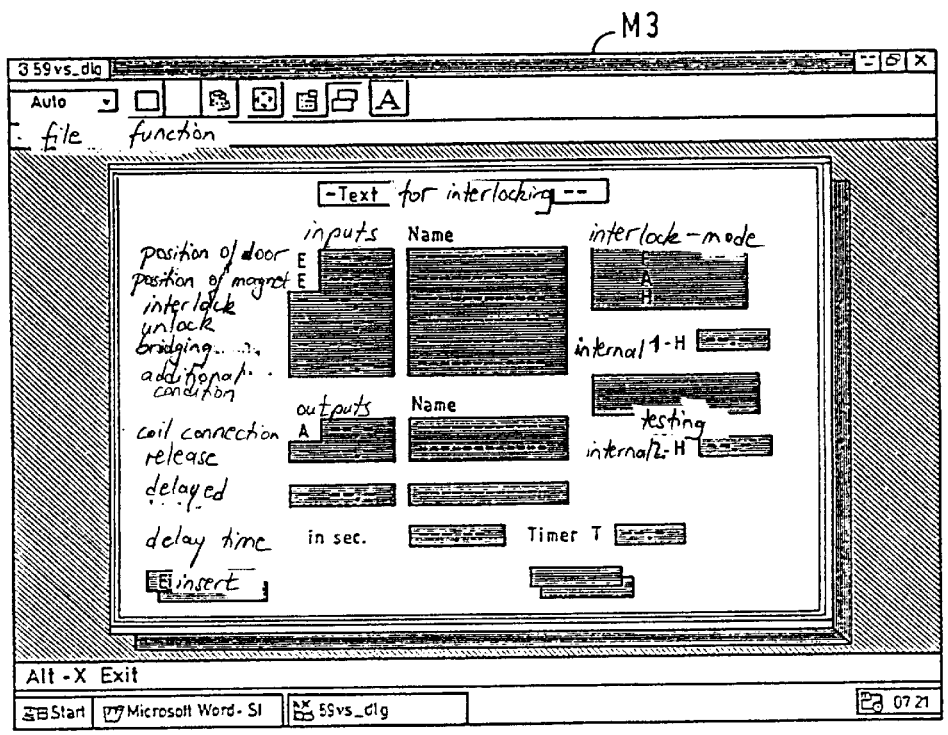

FIG. 14 shows a mask M3 for a locking device module that has substantially the same design as the mask M2 according to FIG. 13.

Figure 15:
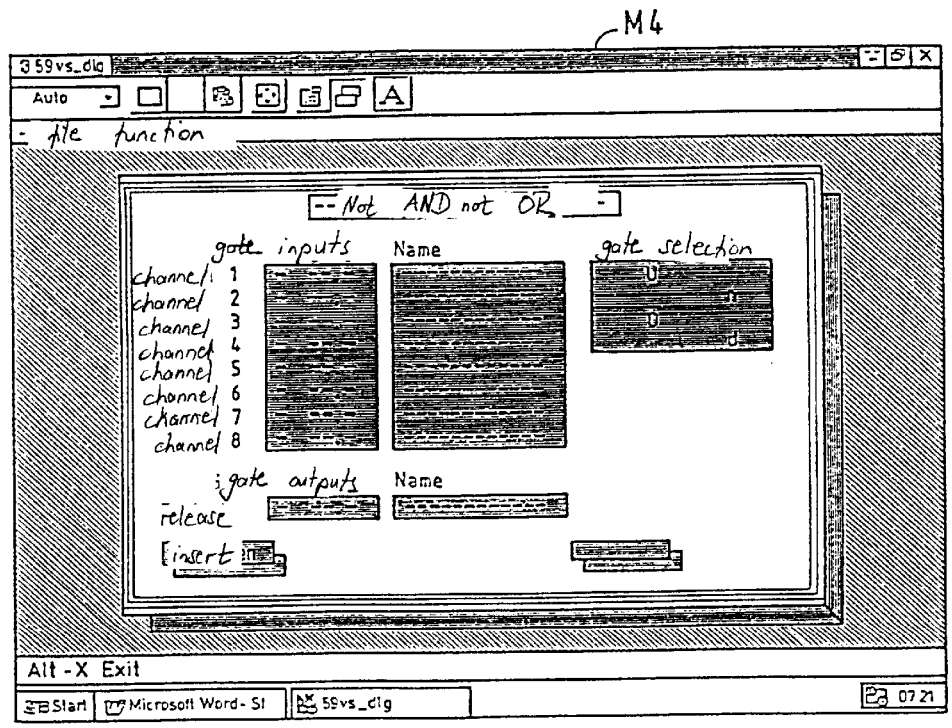

FIG. 15 shows a mask M4 that represents a logic module. With the help of this mask M4, inputs or markers can be linked. Here the logic links "AND", "OR" or "NAND" are available. All logic functions can be programmed by the combination of various logic expressions.

Figure 16:
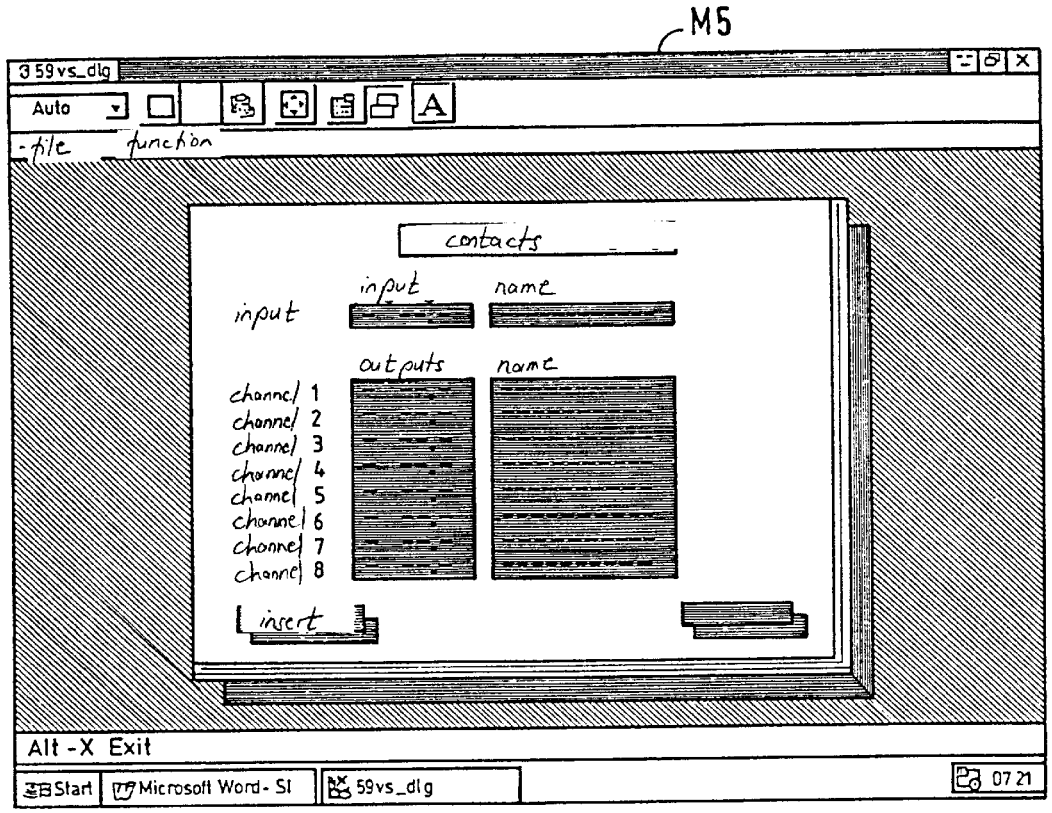

FIG. 16 shows a mask M5 of a contact multiplication module. In an "Input" field an output of a emergency-off module can be inserted, for example, so that one input can act on several outputs. Furthermore the fields "Channel 1 to 8" are provided in which only free outputs can be entered that respond equivalently to the "master input".

Overall, a user-friendly interface for user programming is created. The software is checked with the aid of automatic checking programs for their compliance with self-produced guidelines. Since in accordance with the invention software modules are filed as macros in the bus master 12, they are easy to check and wherever necessary alter for expansion purposes, since instead of total sequence programs interlinked with one another, self-contained and relatively small and clearly verifiable blocks (=macros) form the total program. By the use of a software module for each task such as door tumbler, spring-force locking, magnetic-force locking or emergency-off, these functions can be programmed at the lowest microcomputer or processor level, which increases the transparency and fault-freedom of these program parts in comparison with compiled program codes.

After a user has programmed the required links at the programming unit such as PC, the user program is transmitted via the serial interface 88 to the channel A of the bus master 12. Here the following data are transmitted.

module type (emergency-off, door locking, . . . )

address inputs address outputs and time-lags.

Channel A of the bus master 12 transmits the data parts in inverted form via the link 86 to channel B, which inverts the data back completely and transmits them directly via the serial interface 88 of channel A back to the programming unit. The non-inverted and read-back user program and the inverted and transmitted user program are now in the programming unit. These data are compared in the programming unit.

The channels of the bus master compare user program data received via the link 86. In the respective channel these data are assigned to the appropriate macros and copied into the flash-EPROM 218. Once all data have been transmitted, the user must compare them with the original parameters by loading back the stated parameters. By confirmation of this action, the user can start his program as a test run/commissioning. In addition, the programming unit and the respective channels A and B form a CRC using the received/transmitted data. The programming unit concludes by transmitting its CRC, which is compared by channels A and B.

In the following, implemented monitoring functions are explained. Implemented saving methods or monitoring functions on the bus plane, on the protocol plane and on the processor plane are provided.

Implemented saving methods on the bus plane have been provided by using three out of eight possible data bytes and transferring into these a current counter reading, a current inverted counter reading and a saving byte. Each channel in the master has the information about the counter readings of each module. Each station has its own counter, whose level is filed in the master. The counters of a station (channel A, channel B) are independent.

Accordingly, the information on the counter reading of each station is available four times in the bus master (channel A station planes A, B; channel B station planes A, B). The saving byte contains the information on the status of the inputs/outputs and is stored in the channels of the master with the respective counter readings. The counter readings change with every transmission of a message/status report. The saving byte can remain constant if no change in the output/input statuses occurs. If the counter reading does not change, an internal fault is assumed and the bus system is shut down. The transmission of status messages within the stated time windows is monitored in accordance with the following table I:

TABLE I

| Status transmitted of | Monitored by | Time window/ms |
|---|---|---|
| master | bus end | 15 ms |
|  | all stations | 15 ms |
| bus end | master | 15 ms |
|  | all stations | 15 ms |
| stations | master | 100 ms |

The time windows are the result of the following fault case considerations:

1st Assumption—That One of the Bus Lines 38, 40, 42, 44 is Broken.

Since the bus line is only single-channel, a break in this line would initially not be noticed from the viewpoint of the bus master 12. Since the bus end station 20 as the last station in this chain was necessarily unable to report, its status messages would no longer be present in the bus master 12. The reaction time of the overall system to initial faults must correspond at least to the fault recognition time of traditional safety systems. If relay modules are taken as the basis for these safety considerations, and the break in the supply voltage is recognized as an equivalent fault, this module would ideally drop out in approx. 20 ms.

2nd Assumption—That There is a Fault in Channel A of Station 16

The defect of a channel inside a station that suppresses a transmission of status messages. Since all stations are designed redundant, a failure of one channel within this station would not lead to the loss of the overall function of the station. To achieve a safety failure of the station, at least one further fault within the same station would have to be assumed. As a result the detection time of the first fault is restricted to the time which must be assumed in which the second fault will not yet occur in corresponding probability considerations. The second fault occurrence time was set at <1 hr.

3rd Assumption—That the Bus End Station Has a Defect

In the case of a defect in the bus end station 20, the same considerations apply as with reference to fault description 1, i.e. break of the bus line.

Node B on master B:
Message type 100
Plane 1 040
Unit no. 16 010
750 h for identifier
00101010000+counter+inv. counter+status Unlike with the status messages, the event-oriented messages are provided with a high priority (zero dominant) and are preferred in the arbitration.

Finally, implemented monitoring functions on the processor plane in the form of RAM tests are provided.

To achieve a rapid shutdown of outputs in a bus system with safety functions, it is provided in accordance with the device that the programmable control unit 62, 64 is coupled to the bus via a coupling element, with the programmable control units 62, 64 being assigned a memory element in which information or message contents are filed for the activation of outputs and/or inputs, and where at least one input and/or output can be activated depending on a comparison of the information filed in the memory element with the signals or information transmitted to the bus.

It is provided in accordance with the method that one bus station transmits a message to the bus line, depending on a signal applied to the input and/or the output, with this message being read by at least one other bus station and compared with message contents assigned for the respective bus station, and an action such as shutdown of a release signal being performed by the bus station when there is agreement between the message and the assigned message content.

To permit this, the respective outputs are informed by the bus about which release signal is to be switched to which message contents before commissioning of the system. As a result, there are tables in the memories of the respective output station which contain the message contents that are to lead to shutdown of the respective release signals. The function of the higher-order control is preserved. Only an additional shutdown path is integrated into the system.

The shutdown and/or switch-on tables filed in memory elements in the individual stations are generated automatically in a programming unit. Here those inputs are assigned to each safety-relevant output to which the latter should react. If for example an output depends on a emergency-off switch and a contact of a safety door, this output is assigned an AND function that depends directly on the respective inputs.

Figure 17:
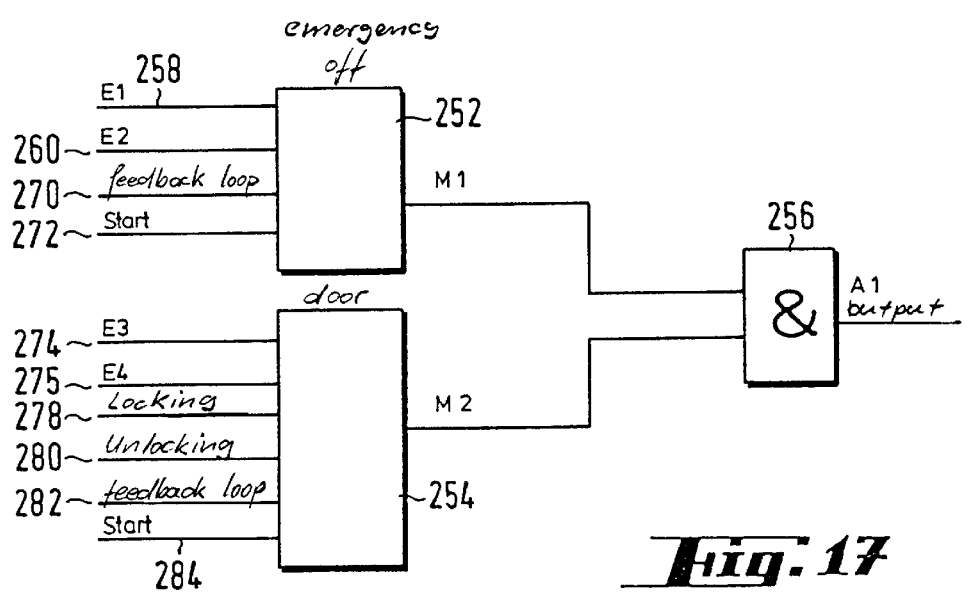
FIG. 17 shows the logic structure of a shutdown table.

FIG. 17 shows the logic structure of a shutdown table. In the design example shown, an output A1 depends on a signal M1 of an emergency-off module 252 and on an output signal M2 of a door module 254. The signals M1, M2 are supplied to an AND element 256 in order to generate a release signal for the output.

The emergency-off module 252 has inputs 258, 260, 270, 272 for input signals E1, E2, "Feedback loop" and "Start". The door module 254 has inputs 274, 276, 278, 280, 282, 284 for input signals E3, E4, "Locking", "Unlocking", "Feedback loop" and "Start". The described shutdown table initiates a direct shutdown of the output A1 when the input information E1 or E2 or E3 or E4 is not met.

If an input station transmits that an input has been opened, this information is read by all output stations and compared with the station's own shutdown table. The shutdown table only has an effect on the shutdown of a release signal. The setting of a release signal can be initiated only by the control unit or by the bus master.

After a user has confirmed the individual modules, the programming unit such as a PC automatically generates a shutdown table and attaches it to the transmission protocol.

The shutdown table is initially filed in the memory of the control. Then the respective shutdown tables are transmitted via the bus to the respective stations. The stations transmit after receipt of the respective shutdown table an echo of the data received, which is checked by the control or by the bus master.

If both channels of a station receive the shutdown table, they perform an internal comparison. The shutdown tables in both channels must be identical, as otherwise no system release signal is given.

If a faulty shutdown table is generated in the programming unit, so that the wrong input information is assigned to an output, this fault is detected as follows:

An output station which is to reset an output on the basis of a request is made to perform the following actions with four independent sets of information:

1. shutdown table channel A
2. shutdown table channel B
3. shutdown by master channel A
4. shutdown by master channel B These sets of information are dependent on one another in terms of timing.

The shutdown by the shutdown tables must always be faster than the shutdown by the control or bus master. The shutdown sequences must be complied with so that a reset is possible after a shutdown. The channels in the respective output station monitor each other for the correctness of the shutdown sequences.

The user-specific data is stored in the flash-EPROM. The flash-EPROM is programmed via the serial interface 88. The user data can be transferred with the aid of a switch and/or different saving mechanisms.

The flash-EPROM is checked using the CRC check mentioned above. The check sum for the CRC check was generated by the user PC and compared with the check sum independently generated by the master station. Only when both of these tally is this check sum stored in the flash-EPROM.

A self-test is also provided for, with a register test, a flag test, an LA test and a command set test also being provided for. A test program is provided for the tests.

The watchdog monitors the self-test functions and is operated with more than one trigger point. It is designed so that not only late triggering but also early triggering is detected.

When the control system is put into service, it starts automatically with an initialization phase. The bus master station 12 asks all connected stations 14 to 20 to transmit their status. If all internal test methods such as REM, ROM, I/O, CPU have been completed, the output planes are released. The use of volatile working memories and of voltage monitoring ICs means that the overall system is back in its original state after every start.

What is claimed is:
1. A safety-oriented control system (10) comprising:
   a plurality of decentralized stations (14, 16, 18, 20) provided with inputs and outputs (138, 140, 142, 144) and at least one centralized station (12) exchanging information with each other via a bus line (38, 40, 42, 44), wherein at least one of the decentralized stations (14, 16, 18, 20) has independent devices (62, 64) for fault-tolerating and/or fault-controlling self-monitoring to ensure normal operation for linkage and evaluation of signals located at an input of at least one decentralized station, and wherein at least one of the decentralized stations has devices for processing of said signals and for generation of independent control commands, wherein the independent device (62, 64) is coupled via a coupling element to the bus line (38, 40, 42, 44), wherein the centralized station (12) is coupled to a programmer that generates a shutdown table independently from the user program programmed by the user and adding said table to the transmission protocol when transmitting the user program to the centralized station (12);

wherein the shutdown table is transmitted from the centralized station (12) to the decentralized stations (14, 16, 18, 20);

wherein the independent devices (62, 64) comprise a storage cell for the shutdown table that is transmitted from the central station via the bus line (38, 40, 42, 44);

wherein the shutdown table comprises shutdown information in the form of logical linkages between inputs of the same and/or inputs of other stations allocated to each output of the station;

wherein the decentralized stations (14, 16, 18, 20) are provided with outputs reading and evaluating all messages transmitted via the bus line (38, 40, 42, 44); and wherein the independent devices (62, 46) have a comparator, in which the messages transmitted via the bus line (38, 40, 42, 44) and the linkages stored in the shutdown table can be compared, where when a linkage assigned to an output is fulfilled a direct shutdown of the output assigned can be performed.

2. Safety-oriented control system according to claim 1, wherein the stations (12, 14, 16, 18, 20) have a redundant design with two independent and galvanically isolated part-systems/nodes or channels (A, B).

3. Safety-oriented control system according to claim 2, wherein redundant part-systems or channels (A, B) each have independent software packages with differing program structure for performance of the same computation.

4. Safety-oriented control system according to claim 2, wherein each channel (A, B) of a station (12, 14, 16, 18, 20) has one of the programmable control units (62, 64).

5. Safety-oriented control system according to claim 2, wherein the stations (12, 14, 16, 18, 20) and/or consumers connected thereto are supplied via the bus line with AC voltage, where each channel (A, B) of a station (12, 14, 16, 18, 20) is assigned a separate power pack (54, 56).

6. Safety-oriented control system according to claim 2, wherein the programmable control units (62, 64) arranged in the channels (A, B) are serially linked to one another via a galvanically decoupled interface (86).

7. Safety-oriented control system according to claim 1, wherein the independent devices has at least one programmable control unit (62, 64) such as a microcomputer that assumes the functions of signal transmission, signal reception and evaluation as well as processing of the signals to control signals.

8. Safety-oriented control system according to claim 1, wherein the stations (12, 14, 16, 18, 20) are linked to one another by a CAN bus line (38, 40, 42, 44), wherein at least the centralized station (12) is a bus start station.

9. Safety-oriented control system according to claim 1, wherein the control system (10) is designed as a bus line.

10. Safety-oriented control system according to claim 1, wherein the bus line (38, 40, 42, 44) extends between the bus start station (12) and a bus end station (decentralized station) (20) and further decentralized stations (14, 16, 18) with a bus input (26, 28, 30) and a bus output (32, 34, 36) are incorporated into the bus line.

11. Safety-oriented control system according to claim 1, wherein bus signals or information are exchangeable between the stations (12, 14, 16, 18, 20), wherein one of said stations provides the bus with information on the basis of a state change to the input, which is read and evaluated by at least one further station, and where the stations perform independently allocated control functions depending on the information received.

12. Safety-oriented control system according to claim 1, wherein the centralized station (12) is designed as the bus master and assumes higher-order bus control functions.

13. Safety-oriented control system according to claim 1, wherein signals are mutually exchanged between the centralized station (12) and a decentralized station for checking of the bus line.

14. Safety-oriented control system according to claim 1, wherein the bus line has a data line (46) and a power supply line (48) each with two conductors.

15. Safety-oriented control system according to claim 1, wherein at last the centralized station (12), is connected to an external isolating transformer (52) for generation of the supply AC voltage.

16. Safety-oriented control system according to claim 1, wherein at least the centralized station (12) has a serial interface (88, 90) such as an RS 232 or CAN interface for programming of the system.

17. Safety-oriented control system according to claim 1, wherein at least the centralized station (12) and at least the bus end station (20) each have units for generating preferably periodic bus messages or bus signals and devices for receiving bus messages or bus signals, and wherein a fault message is generated within a certain period if there are no bus messages.

18. Safety-oriented control system according to claim 1,
wherein the programmable control units (62, 64) are each connected on the output side with an electromechanical switching unit (146, 148) such as a relay for control, said electromechanical switching unit having switching contacts (130, 132, 134, 136) that perform a higher-order shutdown function.

19. Safety-oriented control system according to claim 1, wherein the message contents are filed in the form of a table.

20. A method for operation of a safety-oriented control system (10) with a plurality of decentralized stations (14, 16, 18, 20) provided with inputs and outputs (138, 140, 142, 144) and at least one centralized station (12) exchanging information with each other via a bus line (38, 40, 42, 44), wherein in at least one of the decentralized stations (14, 16, 18, 20) a linkage and evaluation of signals located at the inputs (138) of the same stations takes place and a message is transmitted to a bus line (38, 40, 42, 44) in dependence of signals located at the inputs (138), said signals being received and evaluated by the centralized station (12) or at least one of the decentralized stations (14, 16, 18, 20); comprising, generating a shutdown table independently in a programmer on the basis of a user program programmed by a user, where said shutdown table is attached to the transmission protocol when transmitting the user program to the central station (12);

transmitting the shutdown table to each decentralized station (14, 16, 18, 20) via a bus line (38, 40) originating from the centralized station (12) comprising outputs prior to starting the control system (10);

wherein the shutdown table includes shutdown information assigned to each output of the decentralized station (14, 16, 18, 20), said information being provided in the form of logical linkages between inputs of the same station and/or inputs of further stations;

wherein the decentralized station (14, 16, 18, 20) comprising outputs read all messages transmitted via the bus line (38, 40) and check whether the messages transmitted via the bus line (38, 40, 42, 44) correspond to a logical linkage stored in the shutdown table; and wherein when fulfilling a linkage being assigned to an output, a direct shutdown of the output assigned takes place.

21. Method according to claim 20 wherein message contents (shutdown tables) in the form of logic links between inputs and outputs (138, 140, 142, 144) of the control system (10) are filed in at least one centralized station, wherein a message content assigned to one decentralized station (14, 16, 18, 20) is transmitted to the respective decentralized station via the bus line, and wherein the decentralized station (14, 16, 18, 20) independent of a control program, running in at least one of said centralized stations reacts directly or indirectly to a message content in form of a data block, transmitted via the bus line and corresponding to the filed data content.

22. Method according to claim 20, wherein one or more inputs (142, 144) are assigned to each safety-relevant output (138, 140), the state change of which effects a shutdown of the respective output.

23. Method according to claim 20, wherein the shutdown table initiates a direct shutdown of the assigned output (138, 140) when predetermined input information is met/not met.

24. Method according to claim 20, wherein the stations (12, 14, 16, 18, 20) having outputs (138, 140) independently initiate the shutdown of outputs (138, 140) depending on the information located at the bus line.

25. Method according to claim 20, wherein the shutdown of the outputs (138, 140) by the bus stations takes priority even before the shutdown by the centralized station (12).

26. Method according to claim 20, wherein said the stations have a redundant design with two independent and galvanically isolated part-systems/nodes or channels (A, B).

27. Method according to claim 26, wherein in the case of two-channel stations (12, 14, 16, 18, 20) a comparison is made between the shutdown tables of both channels (A, B).

* * * * *